3,037,948
METHOD OF PREPARING SOLUTIONS OF POLYMERS IN SOLVENTS IN WHICH THEY ARE DIFFICULTLY SOLUBLE
Yvan Landler, Sceaux, and Pierre H. Lebel, Asnieres, France, assignors to Societe Polyplastic, Paris, France, a corporation of France
No Drawing. Filed Jan. 31, 1958, Ser. No. 712,323
Claims priority, application France Mar. 3, 1954
4 Claims. (Cl. 260—4)

This invention relates to a method of dissolving polymers and particularly fiber-forming polymers and this application is a continuation-in-part of our copending application Serial No. 490,108, filed February 23, 1955, now abandoned, and of our copending application Serial No. 697,773, filed November 21, 1957.

Certain polar or crystallizable polymers and particularly those of the type conventionally used in the preparation of fibers are substantially soluble only in highly concentrated salt solutions or in high-boiling solvents, as is the case with polyacrylonitrile and polyvinyl chloride, or they may be soluble only at high temperatures in relatively non-volatile solvents, the latter being true of polyvinylidene chloride and polyethylene.

This limited solubility greatly increases the difficulties involved in extruding fibers of such polymers and removing the final traces of solvent which is desirable because the presence of the solvent always impairs the characteristics of the resulting fiber product. Moreover such solvents are expensive.

It is an object of this invention to overcome these difficulties and to provide a method whereby polymers of the character indicated are rendered soluble in common and inexpensive volatile solvents.

In our above-mentioned co-pending applications, methods are described for preparing so-called "graft" co-polymers by means of which highly homogeneous products were obtainable. These graft co-polymers differ particularly from conventional co-polymers with respect to solubility in common solvents.

Particularly it is possible to prepare a graft copolymer of a monomer which, by polymerization, would yield a fiber-forming polymer that would be insoluble in a volatile solvent with another monomer which, by polymerization, would yield a polymer soluble in the said solvent, the graft copolymer being soluble in this volatile solvent.

We have now found that the conventional, non graft, fibre-polymer is soluble in the graft copolymer solution.

Thus, we have found a method whereby fiber-forming polymers are rendered soluble in common and inexpensive volatile solvents.

This method comprises the steps of preparing a graft copolymer of the character indicated above, dissolving it in the volatile solvent in which one of the two constituents of the graft copolymer is soluble.

In the solution so obtained, the fiber forming polymer is soluble.

There are different ways to prepare this graft copolymer solution. Should this graft copolymer be in a solid state, we would grind it into small particles and then, dissolve them in the volatile solvent by stirring and heating slightly this solvent.

In many cases, it is very convenient to prepare the graft copolymer directly in solution. One method has been described in our copending applications S.N. 490,108 and 697,773. The preparation of this graft copolymer solution forms no part of the present invention.

Fiber forming polymers to which this invention is particularly applicable are diethyleneglycolterephthalate, polyacrylonitrile, copolymers of acrylonitrile with other vinyl monomers, vinylidene chloride, vinyl chloride, copolymers of vinylidene chloride with other vinyl monomers, polyamides and the like. Such fiber forming polymers are described, for instance, in "Man Made Fibers" by R. V. Moncrieff edited by "The National Trade Press Ltd.," London, 1957.

Assuming that we are willing to prepare solution of a fiber-forming polymer A, selected from the group indicated above in a volatile, inexpensive solvent S, we have to select another polymer B which is known as being soluble in this solvent S. It is known, for instance, that polystyrene is soluble in aromatic hydrocarbons like benzene, toluene, xylene, in lower ketones like methyl ethyl ketones, polymethylacrylate soluble in aromatic hydrocarbons, polyvinylchloride is soluble in cyclohexanone.

An illustrative list for solvents can be found, for instance, in "Manuel des Plastiques" by P. Dubois, P. Cor and R. Colin, Presses Documentaires, Paris, pages 214 to 273.

The polymers A and B being so known, we prepare a solution in the solvent S of a graft copolymer of A and B, as said hereabove. In this graft copolymer, the polymer A may be sometimes the backbone polymer, sometimes the branches of the graft copolymer. Having so obtained this graft copolymer solution, it is possible to add polymer A and to have it dissolved in this solution.

While we have said that this polymer A is a fiber forming polymer because it is in this field that our invention seems to have a special interest, we do not want to limit our invention to them.

This invention can be applied to any polymer to render it soluble in a solvent in which it is normally not soluble.

The term "polymer" is used in this specification and in the claims in a generic sense in accordance with the definition contained in Chapter 1, more particularly page 16 et seq. of "Fundamental Principles of Polymerization," by G. F. D'Alelio, and includes compounds formed from one or more kinds of monomers.

According to tihs definition "oligomers" as defined on page 20 of the D'Alelio book are without the scope of the invention. The invention is particularly applicable to macromolecules having a molecular weight greater than 2,000.

Thus the term polymer includes not only homopolymers, copolymers and interpolymers as these terms are known in the art but it also includes a mixture of two or more homopolymers or of two or more copolymers, or of at least one homopolymer with at least one copolymer, as well as homopolymers, copolymers or mixtures thereof which have been chemically modified as by vulcanization, cross-linking, esterification, oxidation, and the like.

Examples of polymers, suitable for use as backbone polymers, in accordance with our invention for the preparation of graft copolymers are natural rubbers, synthetic rubbers obtained from dienes, butyl rubber, vinyl polymers including halogenated vinyl polymers, and, in general, the homopolymers, copolymers and inter-polymers of the polymerizable olefinic compounds containing at least one >C=C< group such as the polymers of maleic acid and maleic acid esters, tetrahaloethylenes and vinylidene-type compounds. Particularly preferred are the polymers of the vinylidene-type monomers, i.e. compounds containing at least one $CH_2$=C< group. Examples of the vinylidene-type polymers are the polymers of the butadienes, such as butadiene-1,3, 2,3-dimethyl-butadiene-1,3, piperylene, isoprene, chloroprene, aromatic compounds such as styrene, alpha-methylstyrene, dichlorostyrene, vinyl naphthalene and vinyl phenol, polymers of the unsaturated acids, such as acrylic acid and the alpha-alkyl substituted acrylic acids, such as alpha-methyl and alpha-butyl acrylic acid, polymers of the esters and halogen derivatives of these unsaturated acids, such as methyl acrylate, methyl methacrylate, butyl-methacrylate, alpha-chloromethyl acrylate and propyl acrylate, the polymers of the vinylidene halides such as vinylidene chloride and vinylidene bromide, the polymers of the vinyl esters of inorganic acids, such as the halogen acids, and hydrocyanic acid such as vinyl chloride, vinylbromide, acrylonitrile, and methacrylonitrile, polymers of the vinyl esters of the monocarboxylic acids such as vinyl acetate, vinyl chloroacetate, vinyl benzoate, vinyl laurate, vinyl valerate, and vinyl caproate, the polymers of the vinyl esters of the polycarboxylic acids, such as divinyl succinate, divinyl adipate, vinyl allyl phtalate, vinyl methallyl pimelate and vinyl methyl glutarate, the polymers of the vinyl esters of the unsaturated acids, such as vinyl acrylate, vinyl crotonate, and vinyl methacrylate, and the polymers of the vinyl ethers such as vinyl methyl ether, vinyl ethyl ether, vinyl butyl ether, and vinyl allyl ether, vinyl isobutyl ether, and the vinyl ketones, such as vinyl butyl ketone, and vinyl ethyl ketone. Further examples of polymers suitable for use are polyvinyl fluoride, polyisobutylene, a copolymer of 10 percent vinyl chloride and 90 percent vinylidene chloride, a copolymer of 25 percent methacrylonitrile and 75 percent methyl methacrylate, a copolymer of 40 percent styrene and 60 percent vinyl chloride, a copolymer of 50 percent vinyl fluoride and 50 percent ethacrylonitrile, an interpolymer of 5 percent methyl methacrylate, 30 percent methylstyrene and 65 percent methacrylonitrile, an interpolymer of 30 percent vinylidene chloride, 20 percent vinyl chloride and 50 percent methyl methacrylate, and an interpolymer of 3 percent vinyl acetate, 40 percent vinyl butyrate, 30 percent methyl methacrylate and 27 percent methacrylonitrile.

Further examples of the polymers that may be used in the process of this invention are cellulose, cellulose esters and cellulose ethers, such as cellulose acetate, cellulose nitrate, cellulose propionate butyrate, cellulose acetobutyrate, methyl cellulose, ethyl cellulose, butyl cellulose, and propyl cellulose, phenol aldehyde condensation polymers, such as phenol-formaldehyde polymers, phenolacetaldehyde polymers, resorcinol-formaldehyde and resorcinol-acetaldehyde polymers, alkyd resins such as the polyesters of glycol and phthalic acid, 1-3-pentanediol and succinic acid of glycol and glutaric acid, and esters of adipic acid, polyamides, such as those obtained by reacting trimethyladipic acid with hexamethylenediamine, polymers known in the art as nylon 610 and nylon 66, and the like, polymers of ethylene oxide and tetrahydrofuran, polyethylene, polypropylene, polytetrafluoroethylene, polytrifluorochloroethylene, polymers of the carbonic acid esters of the unsaturated diols such as butadiene-3,4 carbonate, polymers of the unsaturated esters of the unsaturated acids, such as diethyl fumarate and diethyl maleate, polyurethanes, which are reaction products of polyesters and diisocyanates, for example the products sold under the trade name Vulkollan. Our process is also applicable to the grafting of silicones such as dimethypolysiloxanes and the like, aminoplast resins such as ureaformaldehyde polymers, aniline-formaldehyde polymers, and the like, natural resins such as rosin and the various natural gums, and derivatives such as ester gum, and the like.

Thus, the polymers which are suitable, for treatment in accordance with our invention include those which contain either a double bond or a tertiary hydrogen atom i.e. an oxidizable hydrogen attached to a tertiary carbon atom, but the invention is not limited to such polymers.

The monomer which is grafted to the backbone polymer in accordance with our invention is suitably, although not exclusively, a vinylidene compound, viz. a compound having at least one $CH_2=C<$ group in the molecule, i.e. a methylene group connected by a double bond to another carbon atom. It will be understood that mixtures of monomers as well as the individual monomers may be used to graft a polymer or a mixture of polymers.

Examples of such compounds include the conjugated, open-chain dienes such as the butadiene-1,3 hydrocarbons including butadiene-1,3, isoprene, 2,3-dimethyl butadiene-1,3, and the like, chloroprene, 3-cyano butadiene-1,3, piperylene and the like, trienes such as myrcene, mixtures of conjugated dienes with vinyl and vinylidene compounds such as vinylidene chloride, styrene, p-chlorostyrene, 3,5-dichlorostyrene, p-methoxystyrene, acrylic and alpha-alkyl acrylic acids, their esters, nitriles and amides such as acrylic acid, methacrylic acid, methyl acrylate, octyl acrylate, methyl methacrylate, lauryl methacrylate, acrylonitrile, alpha-chloro acrylonitrile, methacrylonitrile, di-methyl acrylamide and the like, vinyl pyridine, vinyl benzoate, vinyl ketones and vinyl ethers, vinyl carbazole and the like, compounds copolymerizable with the dienes, such as isobutylene, diallyl maleate, 1,4-divinyl benzene and the like, compounds containing both olefinic and acetylenic bonds such as vinylacetylene, vinyl ethynyl carbinol and the like, vinylidene compounds containing only one carbon to carbon double bond such as the vinyl compounds including vinyl chloride, vinylidene chloride, styrene, p-chlorostyrene, 3,5-dichlorostyrene, p-methoxystyrene, acrylonitrile, methacrylonitrile, alpha-chloro-acrylonitrile, methyl acrylate, ethyl acrylate, methyl methacrylate, butyl ethacrylate, dimethyl acrylamide, vinyl methyl ketone, vinyl methyl ether, vinyl pyridine, vinyl acetate, vinyl propionate, vinyl benzoate and the like, isobutylene, ethylene and other mono-olefinic polymerizable compounds. The above-mentioned vinylidene compounds may be copolymerized with one another or with other unsaturated polymerizable materials such as diethyl maleate, diethyl fumarate, maleic acid, maleic anhydride and the like.

In addition to monomers characterized by the $CH_2=C<$ group, our process is also applicable to monomers characterized by the $CF_2=C<$ group, such as tetrafluoroethylene and the like which may be used alone or in admixture with one or more monomers of this group or of the vinylidene group set forth above. Thus, our process is generally applicable to the grafting of all monomers susceptible of being polymerized by a free radical mechanism.

When the polymer A is a fiber-forming polymer it is so possible according to our invention, to prepare a solution of a mixture of the pure fiber-forming polymer and the graft copolymer.

The method of precipitating the fibers from this solution forms no part of our invention.

These methods are well known from people skilled in this art and references can be made to "Man Made Fibers" by R. W. Moncrieff, edited by "The National Trade Press Ltd.," London (1957).

If the solutions are used for producing fibers by a wet spinning process the coagulation bath should be preferably a precipitant for the fiber forming part of the polymer. The spinning steps can be carried out by using any conventional wet spinning equipment; reference is made to "Polymer Processes," by C. E. Schildteneck, Interscience Publishers, 1956, pages 837 to 878.

The following specific examples are further illustrative of our invention without being limitative thereof and in these examples all parts are by weight.

*Example 1*

120 cc. of a polystyrene solution in carbon tetrachloride containing 1.2 grams of polystyrene per 100 cc. of solution, were ozonized until the polymer contains one ozonide group per 50 styrene units. 400 cc. acrylonitrile are then added and the mixture is heated under an air pressure of 0.01 mm. Hg at 125° C. for two hours. A polymer containing 52% acrylonitrile was thus obtained.

There were added to this solution 40 mg. of benzoyl peroxide and heating was resumed in vacuo for 2 hours at 125° C. There was obtained a slightly iridescent solution containing 77% acrylonitrile. This solution remained stable even after several weeks storage. On precipitation with alcohol, desirable fiber stock was obtained, having better mechanical behavior than does the corresponding conventional copolymer having the same overall composition but prepared by co-polymerization of the styrene and acrylonitrile monomers, which latter copolymer is not soluble in carbon tetrachloride. The fibers obtained after precipitation and drying become insoluble in carbon tetrachloride and 57.8% are soluble in a saturated sodium perchloride solution, showing that the second polymerized fraction did not become grafted to the initial polystyrene.

*Example 2*

1.44 grams of polystyrene in powder form were ozonized until there was obtained 1 ozonide group per 50 styrene units of the polymer, and the ozonized polymer was then dissolved in benzene to form a 1.2% solution and the procedure of Example 1 was followed. Approximately the same results were obtained but the amount soluble in perchlorate solution was 61%.

*Example 3*

120 cc. of a solution containing 1.2% polystyrene in carbon tetrachloride were ozonized to obtain 1 ozonide per 65 styrene links. 50 grams of vinyl chloride were then added in an autoclave and the mixture was heated 10 hours at 115° C. under vacuum (0.01 mm. Hg). A solution was obtained containing 2.35 grams polymer per 100 cc. solution.

30 mg. of $\alpha,\alpha'$-azobiisobutyronitrile were added and the mixture was heated 10 hours at 115° C. A solution was obtained containing 5.1% of the polymer.

*Example 4*

1.5 grams of polyvinylacetate in the form of very fine powder were ozonized until there was obtained 1 ozonide group per 65 vinyl acetate links. The ozonized polymer was dissolved in 120 cc. chloroform and 60 grams of vinylidene chloride were added and heat was applied for ¾ hr. at 127° C. 2.1 grams of polymer were obtained which remained soluble in the chloroform and could be redissolved therein at high temperature after precipitation and drying.

The 2.1 grams of graft copolymer were placed into 200 cc. of chloroform and 70 grams of vinylidene chloride were added and the temperature was raised to 105° C. for 40 hours. 6.2 grams of a polymer were obtained which remained dissolved in the chloroform.

*Example 5*

The same procedure as in Example 1 was followed in the preparation of the first polymer. Then 60 mg. of benzoyl peroxide and 0.15 cc. of dimethylaniline were added and the mixture was allowed to stand 3 hours at 40° C. in vacuo. A product was obtained containing 81% polyacrylonitrile.

*Example 6*

1 gram of polyacrylonitrile was ozonized until there was formed 1 ozonide unit per 100 acrylonitrile links. A mixture was then added comprising 2 grams of styrene and 200 cc. of carbon tetrachloride and the temperature was raised to 125° C. for three hours in vacuo. The polyacrylonitrile which becomes grafted dissolves and there were obtained 2.8 grams of a graft copolymer containing 35.7% acrylonitrile.

There were added to this solution 30 cc. of acrylonitrile and 60 mg. of benzoyl peroxide and the temperature was raised to 127° C. for two hours in vacuo, yielding a solution containing 3.7% polymer. 61% of this polymer was soluble in a concentrated sodium perchlorate solution. Analysis showed that the product soluble in sodium perchlorate consists essentially of polyacrylonitrile.

What we claim is:

1. A method for preparing a solution of a first organic polymer having a molecular weight of at least 1500 of a first polymerizable ethylenically-unsaturated monomer in a volatile organic solvent for an organic homopolymer having a molecular weight of at least 1500 of a second polymerizable ethylenically-unsaturated monomer which is different from said first monomer but said first polymer being normally not soluble in said solvent for said homopolymer, which comprises the steps of preparing a solution in said solvent of a graft copolymer which is soluble in said solvent, said graft copolymer being formed from said first monomer and said second monomer which will yield upon polymerization said homopolymer which is soluble in said solvent, adding said first monomer to said solution, and polymerizing said first monomer in said solution in the presence of said graft copolymer, whereby said first monomer yields a polymer which remains dissolved in said solution.

2. A method as defined in claim 1, wherein said graft copolymer is prepared by polymerizing one of said monomers with an ozonized organic polymer of the other monomer with said ozonized polymer as the sole polymerization catalyst.

3. A method for preparing a solution of a first organic polymer having a molecular weight of at least 1500 and formed from a polymerizable ethylenically-unsaturated monomer in a volatile organic solvent for a second organic polymer having a molecular weight of at least 1500 and different from said first polymer but said first polymer being normally not soluble in said solvent for said second polymer, which comprises the steps of dissolving in said solvent said organic second polymer soluble in said solvent, subjecting said second polymer to the action of ozone by passing a stream of ozone through the resultant solution to form an ozonized polymer, adding a quantity of said first monomer to said solution, reacting said ozonized polymer with said ethylenically-unsaturated monomer to form a graft copolymer, and adding said first polymer to said solution.

4. A method for preparing a solution of a first organic polymer having a molecular weight of at least 1500 formed from a first ethylenically-unsaturated monomer in a solvent for a second organic polymer having a molecular weight of at least 1500 and different from said first polymer but said first polymer being normally not soluble in said solvent for said second polymer, which comprises the steps of subjecting said first polymer to the action of ozone at a temperature below 130° C. to form an ozonized polymer, adding said ozonized polymer to a solution in said solvent of a second polymerizable ethylenically-unsaturated monomer which will yield upon polymerization said second polymer soluble in said solvent, reacting said second monomer with said ozonized polymer to form a graft copolymer, adding a quantity of said first monomer and polymerizing said first monomer in said solution, whereby said first monomer yields said polymer which remains dissolved in said solution.

References Cited in the file of this patent

UNITED STATES PATENTS

| | | |
|---|---|---|
| 2,344,843 | Wellman | Mar. 21, 1944 |
| 2,762,790 | Greene | Sept. 11, 1956 |
| 2,798,061 | Coover | July 2, 1957 |
| 2,804,443 | Fordham | Aug. 27, 1957 |
| 2,837,496 | Vandenberg | June 3, 1958 |